United States Patent [19]

McPartlan et al.

[11] Patent Number: 5,822,569
[45] Date of Patent: Oct. 13, 1998

[54] DATA STORAGE DEVICE

[75] Inventors: Maura E. McPartlan; Robert Strahan; Anna M Gallagher, all of Belfast, Ireland

[73] Assignee: British Telecommunications public limited company, Londn, England

[21] Appl. No.: 856,505

[22] Filed: May 15, 1997

Related U.S. Application Data

[63] Continuation of Ser. No. 232,480, Apr. 25, 1994, abandoned.

[30] Foreign Application Priority Data

Feb. 28, 1994 [EP] European Pat. Off. .............. 94301399

[51] Int. Cl.⁶ .............................. G06F 17/30; G06F 12/08
[52] U.S. Cl. ................. 395/500; 395/200.57; 395/200.6; 395/200.67; 395/680; 395/681; 395/683; 395/183.05; 395/853; 364/253.1; 364/260.3; 364/DIG. 1
[58] Field of Search ................................. 395/500, 200.6, 395/200.57, 200.67, 680, 681, 683, 427, 651, 183.05, 853; 364/253.1, 253.2, 260.3, DIG. 1

[56] References Cited

U.S. PATENT DOCUMENTS

| | | | |
|---|---|---|---|
| 4,870,610 | 9/1989 | Belfer | 364/419.02 |
| 5,129,086 | 7/1992 | Coyle, Jr. et al. | 395/650 |
| 5,317,742 | 5/1994 | Bapat | 395/700 |
| 5,432,932 | 7/1995 | Chen et al. | 395/650 |
| 5,434,863 | 7/1995 | Onishi et al. | 370/85.13 |
| 5,491,796 | 2/1996 | Wanderer et al. | 395/200.09 |
| 5,497,373 | 3/1996 | Hulen et al. | 370/79 |

OTHER PUBLICATIONS

Raman, "CMISE Functions and Services", IEEE Communications Magazine, vol. 31, No. 5, May 1993, US Magazine pp. 46–51.

Ben–Artzi et al., "Network Management of TCT/IP Networks: Present and Future", IEEE Network: The Magazine of Computer Communications, vol. 4, No. 4, Jul. 1990, New York US, pp. 35–43.

Copy of specification filed on International Patent Appln. PCT/GB94/00429, "Generic Managed Object Model For LAN Domain".

Oleksiw, "Lan Internetworkl Management", IEEE 192 Network Operations and Management Symposium, New York, US, pp. 556–565, XP344722.

Yoda et al, "Configuration of a Local Fiber Optical Network Management System Based on Multiple Manager Systems Environment", IEEE 1992 Network Operations and Management Sysmposium, New York, US, pp. 731–741, XP344696.

Reasoner, "Management by Proxy Agent", IRE Wescon Convention Record, vol. 35, Nov. 1991, North Hollywood US, pp. 190–195.

(List continued on next page.)

Primary Examiner—Kevin J.. Teska
Assistant Examiner—Thai Phan
Attorney, Agent, or Firm—Nixon & Vanderhye P.C.

[57] ABSTRACT

A data storage device includes a CMIP application component which receives data on network objects using the CMIP protocol from the network manager of a main network. For each attribute of each object, a CMIP/SNMP mapper component converts the CMIP object class name, attribute name and distinguished name of the object into the corresponding SNMP attribute value and this data is stored in an MIB. An SNMP application component receives requests for information from a network manager of a local network. In order to service a valid request, the SNMP application component retrieves the required data from MIB and supplies this data to the network manager for the local network using the SNMP protocol. For changes in the values of certain attributes of certain objects, the SNMP application component issues traps to the manager of the local network.

13 Claims, 8 Drawing Sheets

OTHER PUBLICATIONS

Cox, "SNMP Agent Support for SMDS", IEEE Network-:The Magazine of Computer Communications, Vol. 5, No. 5, Sep. 1991, New York, US, pp. 33–40.

Kauffels, "Schwaches Konzept, aber Produkte–und Umgekehrt", Technische Rundschau, vol. 83, No. 24, 14 Jun. 1991, Bern CH, pp. 40–50 (Drawings Only).

Modiri, "An Implementation of the Network Management Information Service Element Interfaces", IEEE Communications Magazine, vol. 29, No. 7, Jun. 1991, Piscataway, NJ, US, pp. 29–38.

| CMIP Attribute | SNMP Attribute |
|---|---|
| circuitId | pvcId |
| aEndPointName | pvcEndptA |
| zEndPointName | pvcEndptZ |
| administrativeState | pvcAdminState |
| operationalState | pvcOpState |
| circuitBandwidth | pvcCIR |
| userLabels | pvcFreeText |

Fig. 8

| CMIP Attribute | SNMP Attribute |
|---|---|
| equipmentId | btrouterportId |
| administrativeState | btrouterportAdminState |
| operationalState | btrouterportOpState |
| typeText | btrouterportDesc |
| userLabels | btrouterportFreeText |

Fig. 9

| CMIP Attribute | SNMP Attribute |
|---|---|
| functionId | btGNSaccessId |
| administrativeState | btGNSaccessAdminState |
| operationalState | btGNSaccessOpState |
| protocolType | btGNSaccessProtocol |
| userLabels | btGNSaccessFreeText |

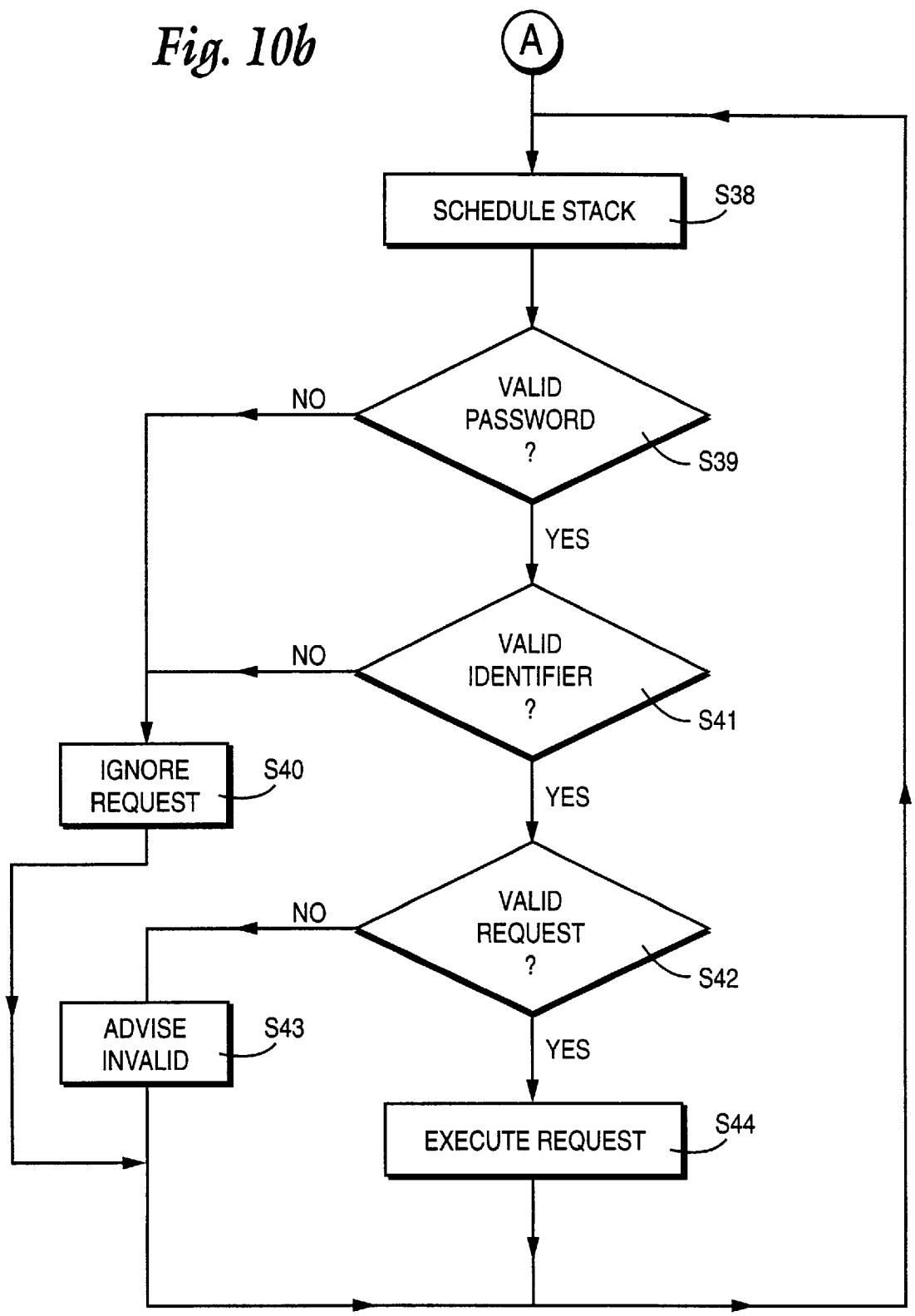

DATA STORAGE DEVICE

This application is a continuation of Ser. No. 08/232,480 filed Apr. 25, 1994 now abandoned.

BACKGROUND OF THE INVENTION

1. Field of the Invention

This invention relates to a data storage device for storing data on individual objects of a telecommunications network and also to a method of operating such a data storage device.

2. Related Art

It is well known that a main telecommunications network may be used to provide communication links between local networks. The main telecommunications network may be a private or public network belonging to a public telecommunications company and the local networks may belong to various other companies. Thus, where a company has local networks at two or more locations, it may use the main network to connect them. It is known to provide network managers for both main networks and for local networks. A network manager receives data from the individual elements of the network which it manages and can send instructions to these elements. Because these two types of networks have developed separately and have different requirements, the information protocol used by the network manager of a local network is usually different from the information protocol used by the network manager of the main network to which the local network is attached. For example, the SNMP protocol is commonly used in local networks while the CMIP protocol is commonly used in main networks. Although the human operator of a network manager of a local network may be mainly interested in the elements of his network, it is also helpful for him to receive information about some of the elements of the main network which is used to connect his local network to other local networks. Because differing protocols are used in the two types of network, it is difficult to transfer data easily from a network manager of a main network to a network manager of a local network.

SUMMARY OF THE INVENTION

According to this invention, there is provided a data storage device for storing data on individual objects of, or related to, a first telecommunications network, said data storage device comprising: means for receiving data according to a first information protocol on individual objects of, or related to, the first telecommunications network from a network manager for that network; means for converting the data received by the data receiving means from a form used in the first information protocol into a form used in a second information protocol; means for storing data on individual objects of, or related to, the first telecommunications network following its conversion by the data converting means; and means for supplying data from the data storing means on individual objects of, or related to, the first telecommunications network according to the second information protocol to a network manager of a second telecommunications network.

Because the data storage device of this invention converts data from a form used in the first information protocol into a form used in the second information protocol before storing it, it facilitates the supply of data according to the second information protocol to a network manager. Thus, the data storage device of this invention may be used for transferring data from a network manager for a main network to a network manager for a local network. It may also be used, if desired, for transferring data from a network manager for a local network to a network manager for a main network.

According to a second aspect of this invention, there is provided a network management system comprising a network manager for a telecommunications network and a data storage device according to the first aspect of this invention. The network management system may include a network manager for a second telecommunications network.

According to a third aspect of this invention, there is provided a method of operating a data storage device for storing data on individual objects of, or related to, a first telecommunications network, said method comprising the steps of: receiving data according to a first information protocol on individual objects of, or related to, the first telecommunications network from a network manager for that network; converting the received data from a form used in the first information protocol into a form used in a second information protocol and storing the converted data; and supplying the converted data on individual objects of, or related to, the first telecommunications network according to the second information protocol to a network manager for a second telecommunications network.

BRIEF DESCRIPTION OF THE DRAWINGS

This invention will now be described in more detail, by way of example, with reference to the drawings in which:

FIG. 8 shows the CMIP attributes and the corresponding SNMP attributes for the object class for a router port used in the software shown in FIG. 3;

FIG. 9 shows the CMIP attributes and the corresponding SNMP attributes for the object class for an access point used in the software of FIG. 3; and FIG. 10a and 10b provide a flow chart of the SNMP application component of the software shown in FIG. 3.

DETAILED DESCRIPTION OF EXEMPLARY EMBODIMENTS

Figure 1:
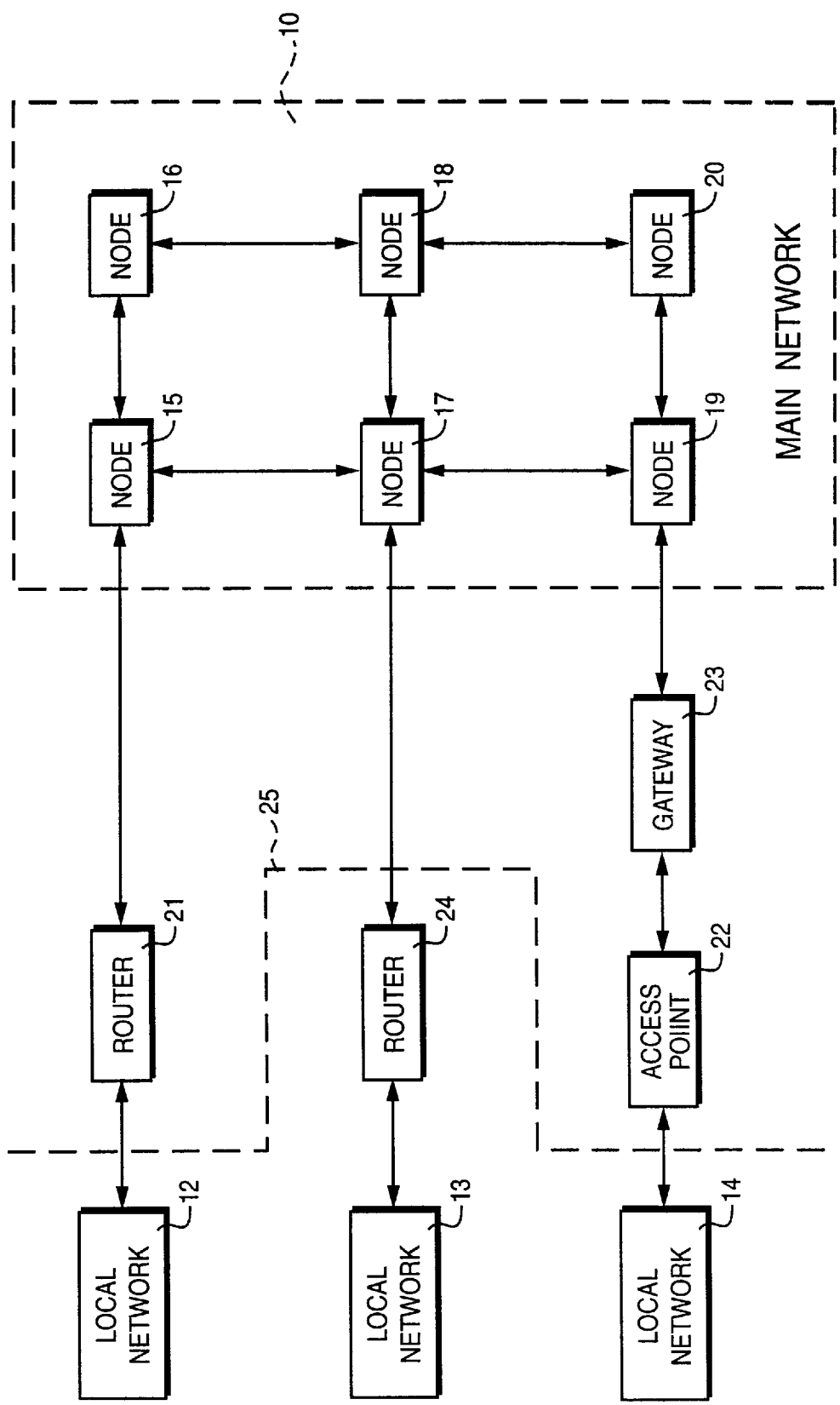
FIG. 1 is a block diagram showing three local networks connected to a main network

Referring now to FIG. 1, there is shown a main network 10 and three local networks 12, 13, 14 which are connected to the main network 10. The main network 10 may be a public or private telecommunications network belonging to a public telecommunications company. The local networks 12, 13, 14 represent only three of the many local networks which are connected to the main network 10. In the present example, the local networks 12, 13, 14 belong to the same organisation which is a completely separate organisation from the owner of the main network 10. The main network 10 has a set of interconnected switching nodes 15 to 20. The local network 12 is connected through a router 21 to the switching node 15, the local network 13 is connected through a router 24 to the switching node 17, and the local network 14 is connected to the switching node 19 through an access point 22 and a gateway 23. The router 21, access point 22 and gateway 23 are associated with and controlled by the main network 10 and so may be regarded as part of the main network 10. The router 24 is associated with and controlled by the local network 13. The dashed line 25 marks the boundary between elements controlled by the local networks 12, 13, 14 and elements controlled by the main network 10.

In the present example, the local networks 12, 13, 14, the router 21, access point 22, gateway 23 and the main network 10 shown in FIG. 1 form part of a frame relay system. Although the present invention will be described with reference to a frame relay system, it is to be appreciated that it may be used in other type of telecommunications systems.

Figure 2:
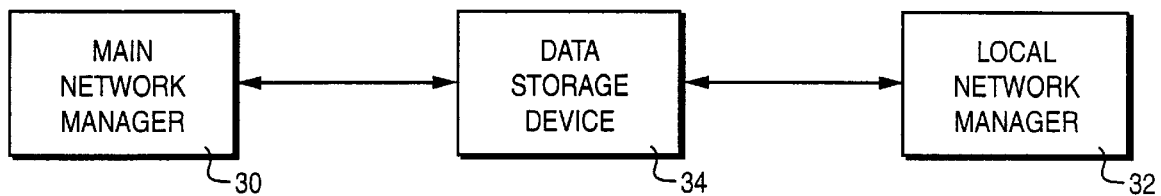
FIG. 2 is a block diagram showing the relationship between a network manager for a main network, a network manager for a local network and a data storage device embodying this invention.
Figure 4:
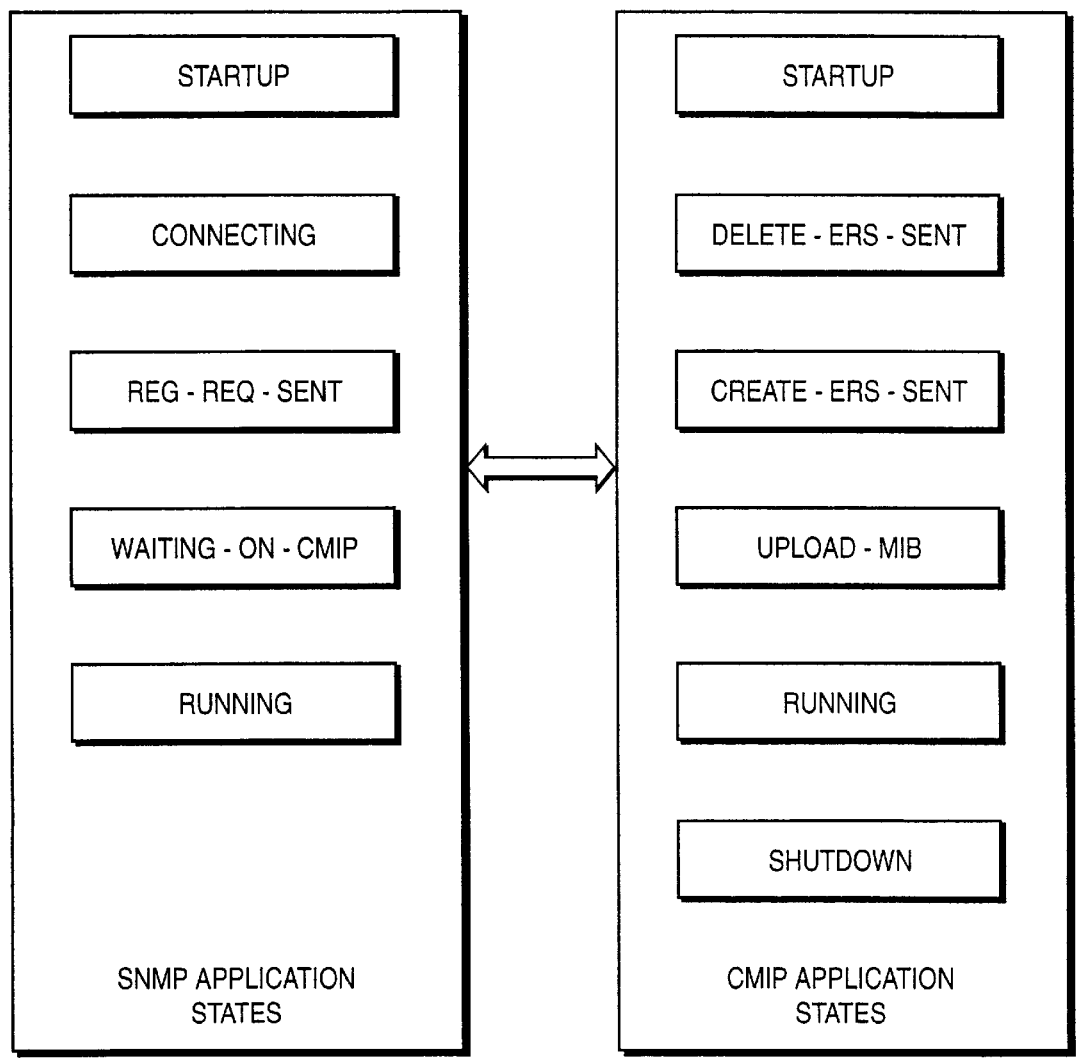
FIG. 4 is a diagram illustrating the operating states of the overall control component of the software shown in FIG. 3.

Referring now to FIG. 2, the main network 10 has a network manager 30. The network manager 30 receives data from the elements of the main network 10 and also the router 21, access point 22 and gateway 23 and sends instructions to them. The network manager 30 is arranged to transmit and receive data according to an information protocol known as the Common Management information protocol (CMIP) and which provides a set of services known as the Common Management Information Services (CMIS). When an element transmits data in another protocol, the data is converted into CMIP. The local network 12 has a network manager 32 which receives information from and sends instructions to the elements of the local network 12. The network manager 32 communicates with these networks using an information protocol known as the Simple Network Management Protocol (SNMP). As the construction of network managers is well known, the network managers 30 and 32 will not be described in further detail. As is also well known, a network manager is usually implemented as a general purpose computer provided with appropriate software.

Although the human operator of the network manager 32 for the local network 12 is mainly interested in the elements of that network, it is also valuable for him to receive data on the state of the elements of the main network 10 as well as the router 21, access point 22 and gateway 23 which are used to provide virtual circuits between the local networks 12, 13 and 14. For example, if the port of the router 21 is disabled, it is useful for the human operator to know this so that he can take appropriate action. Because the network managers 30 and 32 use different information protocols to communicate with their respective network elements, data cannot be supplied directly from the network manager 30 to the network manager 32. In order to enable the network manager 32 to receive data on elements in the main network 10, the network manager 30 for the main network 10 supplies data on these elements to a data storage device 34 which in turn supplies the data to the network manager 32 for the local network 12. The data storage device 34 will be described in more detail below. As will be explained, the network manager 30 supplies data to the data storage device 34 using CMIP and the data storage device 34 supplies data to the network manager 32 using SNMP.

The data storage device 34 may be implemented as a general purpose computer provided with appropriate software. In the preferred embodiment, the data storage device 34 uses the same computer as the network manager 30 with the result that the network manager 30 and the data storage 34 are located together. Alternatively, the data storage device 34 may use the same computer as the network manager 32 or it may be implemented by using a separate general purpose computer which can be located with either of the network managers 30 or 32 or at a position which is remote from both of them.

Both the network managers 30 and 32 operate in what is known as an object-oriented environment. In an object-oriented environment, computer software is used to model real world physical objects as well as other real world entities. The physical objects and entities are simply known as objects. Where, as in the present case, the computer software is managing real world objects, it models only those attributes of the real world objects which are necessary for management. When objects are modelled in this way, they are known as managed objects. A category of objects of the same or similar type is known as an object type. A particular real world object is said to be an instance of an object type. Thus, for example, router ports might be an example of an object type and the individual ports of router 21 are instances of that object type.

Individual software modules which model real world objects are also known as objects. The software implementation of object type is known as object class. Thus, an individual software module which models a particular real world object is known as an instance of the object class to which that object belongs. Each software object is identified by the name of the object class to which it belongs and by an identifier which is specific to the software object itself. Each object class has a set of pre-defined attributes. For example, in the case of an object class for router ports, the attributes may include the operating state of the port. For an instance of a particular object class, each attribute would have a particular value and the values are liable to change.

The network manager 30 uses a set of object classes for modelling the various types of object found in the main network 10. These object classes include three classes which, respectively, model private virtual circuits, router ports and access points. Each of these three object classes has a set of attributes. Each attribute has a pre-defined name and may assume certain pre-defined values. The choice of attributes forming each set, the names of the attributes and the pre-defined values are appropriate for the network manager 30 and CMIP. Similarly, the object classes used by the network manager 32 include three object classes corresponding to the object classes used by the network manager 30 for private virtual circuits, router ports and access points. The names of the attributes as well as their pre-defined values are appropriate for SNMP. For each of these three object classes used in the network manager 30 and the corresponding object class used in the network manager 32, the names of the attributes and values differ between the two corresponding classes. As will be described in more detail below, the data storage device 34 can convert data on the attributes of a particular object class used in the network manager 30 into an appropriate form for the corresponding object class used in the network manager 32.

In SNMP, a network manager issues commands to obtain information from network elements. These commands include Get and Get-Next. A Get command is a request for the value of a particular attribute of a particular object. A Get-Next command is a request for the value of the same attribute of the next object.

The services provided by CMIS include m-Get and m-EventReport. The m-Get service may be a request for the value of a specified attribute of a specified object or for all the attributes of all the objects belonging to a particular object class. An m-EventReport is an offer, for example by a network element to a network manager, to supply data. The data may be the values of a complete set of attributes of a particular object or a change in the value of a particular attribute of a particular object. An m-EventReport is an unsolicited event report.

Figure 3:
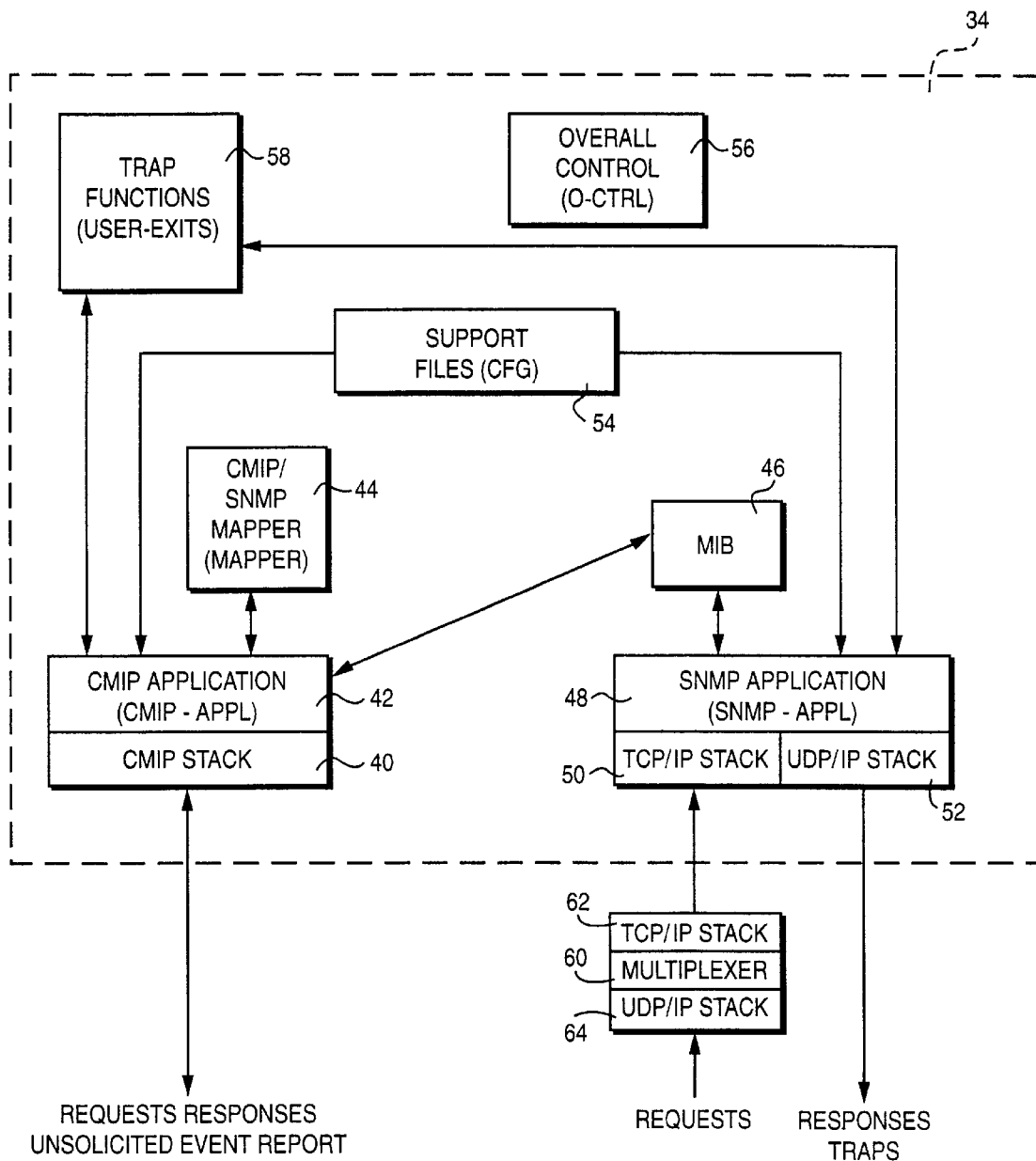
FIG. 3 is a block diagram of the software components of the data storage device shown in FIG. 2.

The software components of the data storage device 34 are shown in FIG. 3. These comprise a CMIP stack 40, a CMIP application component (CMIP-APPL) 42, a CMIP/SNMP mapper component (MAPPER) 44, a management information base (MIB) 46, an SNMP application component (SNMP-APPL) 48, a TCP/IP communications stack 50, a UDP/IP communications stack 52, support files (CFG) 54, an overall control component (O-CTRL) 56 and a trap functions component (USER-EXITS) 58. FIG. 3 also shows a multiplexer 60 together with a TCP/IP communications stack 62 and a UDP/IP communications stack 64.

The CMIP application component 42 is responsible for sending requests to, and receiving responses and unsolicited event reports from, the network manager 30. The CMIP/SNMP mapper component 44 is responsible for converting values of the attributes of each object from the form used in CMIP to a form used in SNMP. When data on the values of the attributes of the individual objects of a telecommunications network is stored in a database, the database is known as a management information base (MIB). MIB 46 stores the values of the attributes of the objects of the telecommunications network 10 after conversion by the mapper component 44. Thus, data is stored in MIB 46 in a form suitable for transmission using SNMP. The SNMP application component 48 is responsible for receiving requests from, and sending responses and unsolicited event report to, the network manager 32. In SNMP unsolicited event reports are called traps. The trap functions component 58 is responsible for selecting which of the unsolicited event reports from the network manager 30 should be passed on as traps to the network manager 32. The various components of the data storage device 34 and also the multiplexer 60 will now be described in more detail.

The CMIP stack 40 is responsible for converting CMIS requests from the CMIP application component 42 into a form for transmission to the network manager 30 and for converting responses from the network manager 30 into a form suitable for the CMIP application component 42. The CMIP stack 40 comprises a CMIP handler and a communications stack. The CMIP handler passes CMIS requests from the CMIP application component 42 to the communications stack and establishes connections as required. It also passes CMIS responses and unsolicited event reports from the communications stack to the CMIS applications component 42. CMIS and CMIP are defined, respectively, in ISO/IEC Standards 9595 and 9596. A suitable software package for the CMIP handler is available from British Telecommunications plc. A suitable software package for a communication stack is available from Retix Corporation of Sainta Monica, Calif., USA.

The TCP/IP stacks 50, 62 enable data to be transmitted using the TCP/IP protocols. Likewise, the UDP/IP stacks 52 and 64 enable data to be transmitted using the UDP/IP protocols. Suitable software packages for the stacks 50, 52, 62 and 64 are commercially available. For example, the well known Sun operating system includes both TCP/IP and UDP/IP stacks.

Although FIG. 2 shows only a single network manager for a local network receiving data from the network manager 30, the present invention may be used to provide data from a network manager for a main network to more than one network manager for a local network. A single data storage device can provide data on the main network to all the local network managers belonging to a particular customer as these local network managers will be interested in the same elements of the main network. However, partly because different customers are interested in different sets of elements of the main network and partly because it may be necessary to restrict the supply of data on network elements for security reasons, it is necessary to provide an individual data storage device for each customer. The data storage devices may be located together or separately. Requests from the various network managers for the local networks are received on a common communication link by a multiplexer 60. Each request includes an identifier for the network manager which is making it. The multiplexer 60 then transmits the request to the appropriate data storage device. The responses and traps are broadcast to the various network managers on a common communication link.

The CMIP application component 42 exists in six operating states, namely, STARTUP, DELETE-ERS-SENT, CREATE-ERS-SENT, UPLOAD-MIB, RUNNING and SHUTDOWN. The SNMP application component 48 exists in five operating states, namely, STARTUP, CONNECTING, REG-REQ-SENT, WAITING-ON-CMIP and RUNNING. The state variable for each of these components is maintained in the overall control component 56. For start-up, the state variable for both components is set to STARTUP. For the CMIP application component, the state variable is changed from one state to another for the next four states by the CMIP application component. As will be explained in more detail below, in the state UPLOAD-MIB, initial data on the elements of the main network 10 are supplied to the CMIP application component. In the state RUNNING, the CMIP application component receives unsolicited event reports from the network manager 30. For shutdown the state variable is changed to SHUTDOWN.

Following start-up the SNMP application component changes its state variable from one state to another for the remaining four operating states. As will be described in more detail below, during the states CONNECTING and REG-REQ-SENT, the SNMP application component establishes a connection with, and registers itself with, the multiplexer 60. During the state WAITING-ON-CMIP, the SNMP application component waits for the completion of supplying the initial data to the CMIP application component. During the state RUNNING, the SNMP application component services requests from the network manager 32 and sends traps to it.

The support files 54 include a list of the CMIP object classes which can be supported by the data storage device 34. In the present example, the data storage device 34 can support CMIP object classes for private virtual circuits, router ports and access points.

Figure 5:
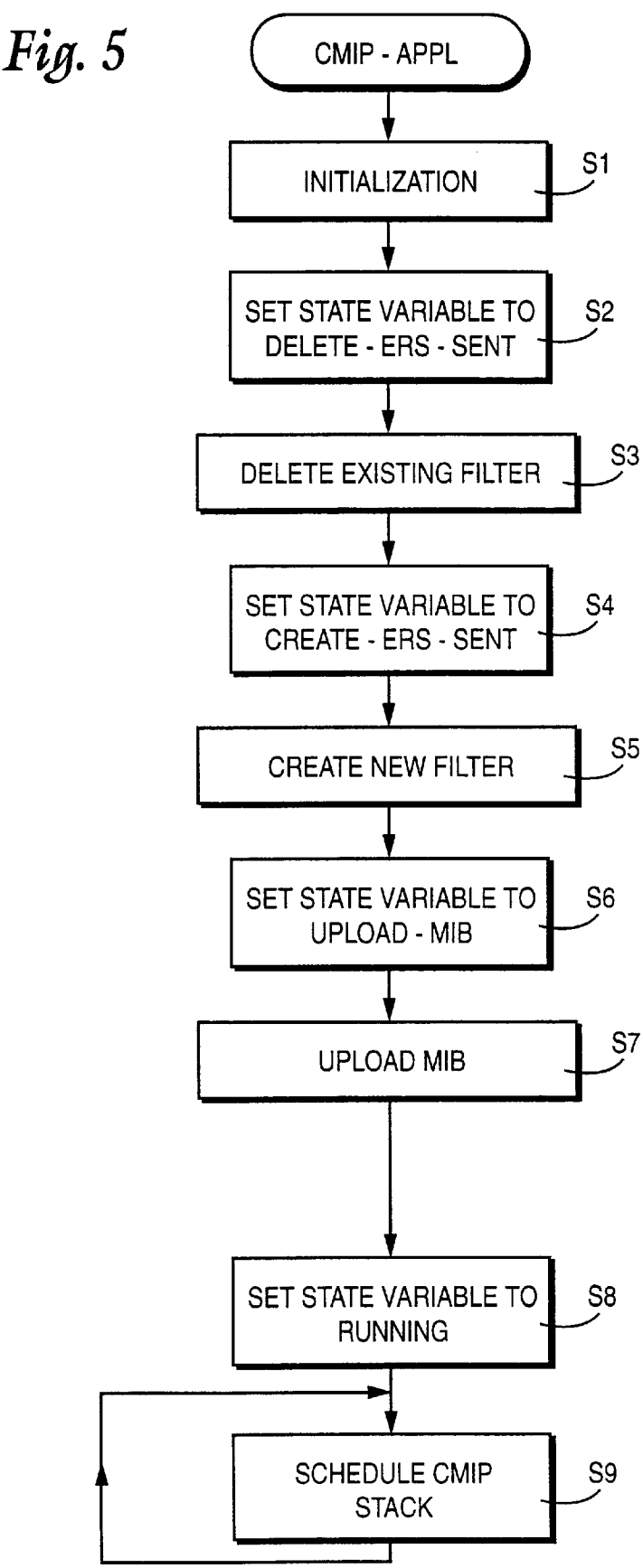
FIG. 5 is a flow chart of the CMIP application component of the software shown in FIG. 3.

The CMIP application component (CMIP-APPL) 42 will now be described with reference to the flow chart shown in FIG. 5.

Following start up of the data storage device 34, in a step S1 the CMIP application component performs initialisation routines. Then, in a step S2, it sets the state variable to DELETE-ERS-SENT.

CMIS provides a function known as a filter. When a filter is in place in a MID, unsolicited event reports are issued when changes occur in the values of specified attributes of objects belonging to specified object classes. In step S3, the CMIP application component sends an instruction to the network manager 30 to delete any filter which is in place with regard to the data storage device 34. The purpose of this is to make sure that any previous filter is cancelled.

Then, in a step S4, the state variable is set to CREATE-ERS-SENT.

Next, in a step S5, the CMIP application component instructs the network manager to create a new filter. This filter specifies both the object classes and the attributes of the three classes for which unsolicited event reports are required. The CMIP application component obtains the data for constructing the filter from appropriate support files 54. The state variable is then changed to UPLOAD-MIB in a step S6.

In order to prevent data storage devices from receiving data to which they are not entitled, the MIB in the main network manager 30 is partitioned and the data storage device 32 has access only to the data contained in the partition associated with it. In a step S7 the CMIP application component sends an m-get request to the network manager 30 for each object class for which it requires data. The names of these object classes are retrieved from the support files 54. Thus, in the present example, it sends m-get requests for the private virtual circuits, router ports and access points object classes. For each object contained both within one of these classes and within the partition associated with the data storage device 34, the network manager sends the appropriate data to the CMIP application component. Specifically, for each object, the main network manager sends the name of the object class, the identifier or distinguished name for the particular instance of the object class and the name and value of each attribute of the object.

The CMIP application component then passes the data to the CMIP/SNMP mapper 44 and the data for that instance is stored in MIB 46. Thus, in this manner, the data for each object class is uploaded into MIB 46.

After receiving data on each instance, the CMIP application component checks whether that instance is the last instance on which data will be sent. If it is not the last instance, the CMIP application component receives data on the next instance. If it is the last instance, it continues with a step S8 in which the state variable is set to RUNNING.

Then, in a step S9, the CMIP application component repetitively schedules the CMIP stack 40 to determine if any unsolicited event reports have been received.

Figures 6, 7:
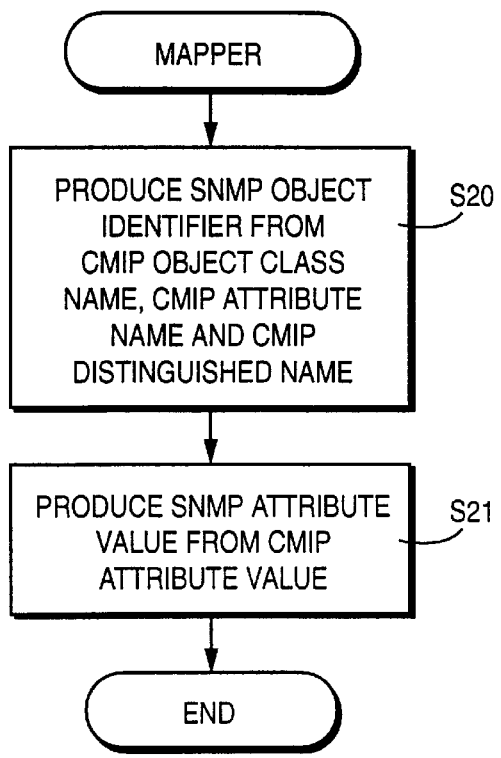
FIG. 6 is a flow chart of the CMIP/SNMP mapper component of the software shown in FIG. 3.
FIG. 7 shows the CMIP attributes and the corresponding SNMP attributes of the object class for a private circuit used in the software shown in FIG. 3.

The operation of the CMIP/SNMP mapper component 44 will now be described with reference to FIGS. 6 to 9. FIG. 6 shows a flow chart for this component. FIGS. 7 to 9 show respectively the CMIP attribute names together with the SNMP attribute names for the object classes for circuits, router ports and access points.

Referring firstly to FIG. 7, it will be seen that the attributes names comprise circuitId, aEndPointName, zEndPointName, administrativeState, operationalState, circuitBandwidth and userLabels. These attribute names refer respectively to the identity of the circuit, the beginning point of the circuit, the end point of the circuit, its administrative state, its operational state, its bandwidth and text which the operator of the network manager 30 may add. Each attribute can have certain values. For example, for a particular circuit, circuitId is the identifier for the circuit and operationalstate can have the values "enabled" and "disabled". The corresponding SNMP attribute names are shown beside the CMIP attributes names. For each value for a CMIP attribute, there is a corresponding value for an SNMP attribute. The SNMP object class also has two traps, namely, pvcCircuitDown and pvcCircuitUp. These two traps are issued, respectively, when the attribute operationalstate changes to "disabled" and "enabled".

Referring now to FIG. 8, the CMIP attributes for a router port comprise equipmentId, administrativestate, operationalState, typeText and userLabels. These refer respectively to the identity of the router port, its administrative state, its operational state, a verbal description of it and text which the operator of the main network 30 may add. Each of these may have one of a number of values. The corresponding SNMP attribute names are shown beside the CMIP attribute names. For each value of a CMIP attribute the corresponding SNMP attribute has a corresponding value. The SNMP object class also has two traps, namely, RouterPortDown and RouterPortUp. These two traps are issued, respectively, when the attribute operationalState changes to "disabled" and "enabled".

Referring now to FIG. 9, the CMIP attributes for the access point object class comprise functioned, administrativestate, operationalstate, protocolType and userLabels. These refer respectively to the identity of the access point, its administrative state, its operational state, the type of protocol which it uses and text which the operator of the network manager 30 may add. The corresponding SNMP attribute names are shown beside the CMIP attribute names. As with the circuit and router port object classes, each CMIP attribute may take one of a number of values and for each of these value there is a corresponding SNMP value. The SNMP object class also has two traps, namely, GNSAccessDown and GNSAccessUp. These two traps are issued, respectively, when the operationalState changes to "disabled" and "enabled".

The mapper component 44 is used by the CMIP application component 42 for converting CMIP attribute values into SNMP attribute values both when receiving the initial data on the various object classes during the operational state UPLOAD-MIB and subsequently when receiving unsolicited event reports during the operational state RUNNING. The mapper component converts each attribute value in turn and FIG. 6 shows the procedure for converting one attribute value.

In SNMP, for a particular attribute of a particular instance of a particular class, the combination of the name of the class, the name of the attribute and the distinguished name or identifier for the particular instance of the class is known as the object identifier. In a step S20 for a particular attribute, the mapper component converts the CMIP class name, attribute name and distinguished name into the corresponding SNMP object identifier. The data for converting the class names and attribute names is stored in the mapper component 44. The method of converting the distinguished names will be described below.

In a step S21, the value of the attribute in CMIP in converted into the corresponding value in SNMP. The method for doing this is described below.

In an SNMP MIB, the values of the attributes of the various instances of a particular class are stored in a table dedicated to that class. Each row of the table is associated with a particular instance of a class and each column is associated with a particular attribute of the class. The data is stored as numerals. More specifically, each class is identified by a unique series of numerals and each attribute of the class is identified by a unique series of numerals. The CMIP distinguished name for an instance of the class is converted into ASCII code. Thus, an SNMP object identifier comprises a series of numerals for the class name, a series of numerals for the attribute name and the ASCII code for the distinguished name.

The attribute values are also converted into numerals. Where an attribute can have only a limited number of states, each state may be identified by a respective numeral. For example, in all three classes, for the attribute operationalState, the values "disabled", "enabled", "active" and "busy" are converted, respectively, into "1", "2", "3" and "4". Where an attribute value is expressed as text, for example the value of the attribute userLabels, the text is converted into ASCII code.

When the local network manager 32 receives an attribute value for a particular object from the data storage device 34, the series of numerals representing the SNMP object identifier and the numeral or numerals giving the attribute value are converted by the network manager into text. Thus, for the attribute operationalState, an attribute value of "1" is converted into "enabled".

Figure 10A:
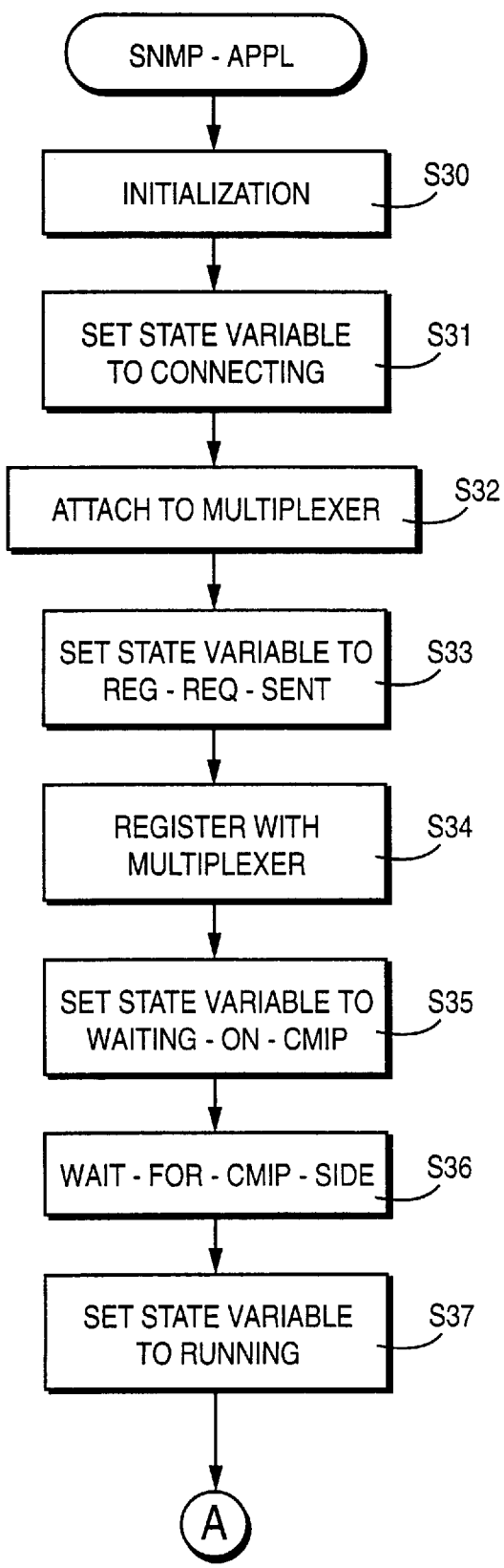

The SNMP application component 48 will now be described with reference to the flow chart shown in FIG. 10. The primary purpose of this component is to service Get and Get-Next requests.

In a step S30, the SNMP application component performs initialisation routines. Then, in a step S31, it sets its state variable to CONNECTING. In a step S32, it forms a connection with the multiplexer 60. In a step S33, it sets its state variable to REG-REQ-SENT. Then, in a step S34, the SNMP application component registers the data storage device 34 with the multiplexer 60 by supplying its identifier to the multiplexer 60.

In a step S35, the SNMP application component sets its state variable to WAIT-FOR-CMIP-SIDE. Then, in a step S36, it waits until the CMIP application component has received all the initial data from the network manager 30 and loaded the corresponding SNMP data into MIB 46. When all the initial data has been loaded into MIB 46 and the CMIP application component has changed its state variable to RUNNING, the SNMP application component changes its state variable to RUNNING in a step S37. Then, in a step S38, the SNMP application component continuously schedules the stack 50 for Get and Get-Next requests.

On receiving a request for an attribute value, in a step S39, the SNMP application component checks if the request contains a valid password. If the request does not contain a valid password, the program continues with a step S40 in which the request is ignored.

If the request contains a valid password, the SNMP application component continues with a step S41. Each request contains an identifier for the local network manager making the request. In step S41, the SNMP application componenet checks whether it is authorised to send data to a local network manager having this identifier. if the identifier is not valid, and the request cannot therefore be authorised, the request is ignored in step S40. If the identifier is valid, the SNMP application component continues with step S42.

In step S42, the SNMP application component checks if the request is valid. For example, if the request is corrupted or relates to an object class on which data cannot be supplied, it is not valid. If the request is not valid, the local network manager is informed of this in step S43. If the request is valid, it is executed in a step S42.

After steps S40, S43 and S44, the SNMP application component returns to step S38.

As mentioned above, the SNMP application component sends unsolicited event reports or traps for changes in the values of some attributes. For each object class, the data in the support files 54 specifies the changes in attribute value which will cause traps to be issued. In the present example, for each object class, a change in the value of the attribute operationstate to "enabled" or "disabled" causes a trap to be issued. When the CMIP application component 42 receives details of a change in an attribute value, it checks with the support files 54 if the change in the attribute value is one for which a trap is issued. If it is one for which a trap is issued, the CMIP application component 42 calls the trap functions component 58 which in turn instructs the SNMP application component 48 to issue a trap to the network manger 32.

Although in the present example the data storage device is used to supply data relating to a main network to a network manager for a local network, the present invention may also be used to enable a network manager of a main network to obtain data from a network manager of a local network.

We claim:

1. A network management system comprising a first network manager for a first telecommunications network, a second network manager for a second telecommunications network, and a data storage device for storing data related to individual objects of the first telecommunications network, said first network manager being arranged to receive and transmit data according to a first network management information protocol, said second network manager being arranged to receive and transmit data according to a second network management information protocol, said data storage device comprising:

means for receiving data according to said first network management information protocol related to individual objects of the first telecommunications network from said first network manager;

means for converting the data received by the means for receiving data from a form used in the first network management information protocol into a form used in said second network management information protocol;

means for storing accumulated data related to individual objects of the first telecommunications network following its conversion by the means for converting data; and means for supplying data from the means for storing data related to the first telecommunications network according to said second network management information protocol to said second network manager.

2. A network management system as in claim 1, including means for containing support data relating to object classes used in the first network management information protocol for which data can be stored in the means for storing data.

3. A network management system as in claim 2, in which the means for receiving data includes means for requesting data from said first network manager for the first telecommunications network for objects belonging to one of said object classes for which data can be stored in the means for storing data.

4. A network management system as in claim 1, in which the first network management information protocol is CMIP, the second network management information protocol is SNMP, and for each attribute value the means for converting is arranged to convert the CMIP class name, attribute name and distinguished name into a corresponding SNMP object identifier and the CMIP attribute value into a corresponding SNMP attribute value.

5. A network management system as in claim 1, in which the means for supplying data is arranged to supply data on an object to said second network manager of the second telecommunications network when requested to do so by said second network manager of the second telecommunications network.

6. A network management system as in claim 1, in which the means for supplying data is arranged to provide unsolicited information to said second network manager of the second telecommunications network when the value changes of a pre-selected attribute related to an object in the first telecommunications network.

7. A network management system as in claim 1, in which said first network manager for the first telecommunications network and the means for storing data are physically located together.

8. A network management system as in claim 1, in which the means for storing data and said second network manager for the second telecommunications network are physically located remotely from each other, the network management system including a telecommunications link for connecting the means for storing data and said second network manager for the second telecommunications network together.

9. A method of operating a network management system comprising a first network manager for a first telecommunications network, a second network manager for a second telecommunications network and a data storage device for storing data related to individual objects of the first telecommunications network, said first network manager being arranged to receive and transmit data according to a first network management information protocol, said second network manager being arranged to receive and transmit data according to a second network management information protocol, said method comprising the steps of:

receiving data according to said first network management information protocol related to individual objects of the first telecommunications network from said first network manager;

converting the received data from a form used in the first network management information protocol into a form used in said second network management information protocol and storing an accumulation of the converted data; and supplying the converted data related to the first telecommunications network according to the second network management information protocol to said second network manager.

10. A method of operating a network management system as in claim 9, including the additional step of requesting data from said first network manager for the first telecommunications network for objects belonging to an object class for which data can be stored in the data storage device.

11. A method of operating network management system as in claim 9, in which the first network management information protocol is CMIP and the second network management information protocol is SNMP, and, in said step of converting the received data, for each attribute value the CMIP object class name, attribute name and distinguished name are converted into the corresponding SNMP object identifier and the CMIP attribute value is converted into the corresponding SNMP attribute value.

12. A method of operating a network management system as in claim 9, in which in said step of supplying converted data, data on an object is supplied to said second network manager of a second telecommunications network when said second network manager of the second telecommunications network requests such data.

13. A method of operating a network management system as in claim 9, in which in said step of supplying converted data, unsolicited information is supplied to said second network manager of the second telecommunications network when the value changes for a pre-selected attribute of an object in the first telecommunications network.

* * * * *